(12) United States Patent
Standifer

(10) Patent No.: US 10,800,468 B2
(45) Date of Patent: Oct. 13, 2020

(54) FIFTH-WHEEL ASSEMBLY

(71) Applicant: FORD GLOBAL TECHNOLOGIES, LLC, Dearborn, MI (US)

(72) Inventor: Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 218 days.

(21) Appl. No.: 16/052,698

(22) Filed: Aug. 2, 2018

(65) Prior Publication Data

US 2020/0039588 A1 Feb. 6, 2020

(51) Int. Cl.
*B62D 53/08* (2006.01)
*F16B 37/04* (2006.01)

(52) U.S. Cl.
CPC ........ *B62D 53/0828* (2013.01); *F16B 37/042* (2013.01)

(58) Field of Classification Search
CPC .............. B62D 53/0828; B62D 53/08; B62D 53/0807; F16B 37/042
See application file for complete search history.

(56) References Cited

U.S. PATENT DOCUMENTS

| | | | |
|---|---|---|---|
| 3,556,559 A | 1/1971 | Interisano | |
| 5,707,070 A | 1/1998 | Lindenman et al. | |
| 7,121,573 B2 * | 10/2006 | Lindenman | B62D 53/08 280/433 |
| 7,234,905 B2 * | 6/2007 | Warnock | B60D 1/015 280/423.1 |
| 7,264,259 B2 | 9/2007 | Lindeman et al. | |
| 7,497,651 B2 * | 3/2009 | Harberts | B60P 7/0815 410/101 |
| 7,658,580 B1 * | 2/2010 | Conway | A47G 3/00 411/374 |
| 7,793,968 B1 | 9/2010 | Withers | |
| 8,360,458 B2 * | 1/2013 | Stanifer | B60D 1/58 280/491.5 |
| 8,414,009 B2 * | 4/2013 | Stanifer | B60D 1/06 280/433 |
| 8,439,387 B1 * | 5/2013 | Connell | B62D 53/08 280/438.1 |

(Continued)

OTHER PUBLICATIONS https://www.etrailer.com/Fifth-Wheel/B-and-W/BWRVK3600.html, B&W Companion OEM 5th Wheel Hitch for Ram Towing Prep Package—Dual Jaw—25,000 lbs., pp. 1-28.

(Continued)

*Primary Examiner* — Jacob D Knutson
*Assistant Examiner* — Michael R Stabley
(74) *Attorney, Agent, or Firm* — David Coppiellie; MacMillan, Sobanski & Todd, LLC

(57) ABSTRACT

A fifth-wheel that includes a horizontal plate and a pair of legs extending upward therefrom. Also including pair of anchors, each having a bushing mounted under the plate, a cap, above the plate, secured to the respective bushing, a T-bolt extending vertically through the respective bushing and cap, and a handle secured to and extending radially outward from the respective T-bolt through a slot in the respective cap; and nuts securing each T-bolt to the respective anchor. The fifth-wheel may also include a cover, pivotable to selectively provide and block access to the anchors.

20 Claims, 6 Drawing Sheets

(56) References Cited

U.S. PATENT DOCUMENTS

| | | | | |
|---|---|---|---|---|
| 8,925,952 B2* | 1/2015 | Leech | ............ | B62D 53/08 |
| | | | | 280/415.1 |
| 9,499,017 B2* | 11/2016 | McCoy | ............ | B60D 1/485 |
| 9,599,141 B2* | 3/2017 | Dobbin | ............ | B64D 45/02 |
| 9,669,906 B2* | 6/2017 | Carnevali | ............ | F16B 21/04 |
| 9,849,738 B2* | 12/2017 | Guthard | ............ | B60F 1/00 |
| 2012/0145851 A1* | 6/2012 | McCoy | ............ | B60D 1/015 |
| | | | | 248/221.11 |
| 2014/0161559 A1* | 6/2014 | Kim | ............ | F16B 37/14 |
| | | | | 411/373 |
| 2015/0030386 A1* | 1/2015 | Carnevali | ............ | F16B 21/02 |
| | | | | 403/348 |
| 2018/0057123 A1* | 3/2018 | Gunner | ............ | B63B 32/70 |

OTHER PUBLICATIONS https://www.etrailer.com/Fifth-Wheel/Curt/C16530-16017.html, Curt Q20 5th Wheel Trailer Hitch for Ford OEM Legs—Dual Jaw—20,000 lbs., pp. 1-25.

* cited by examiner

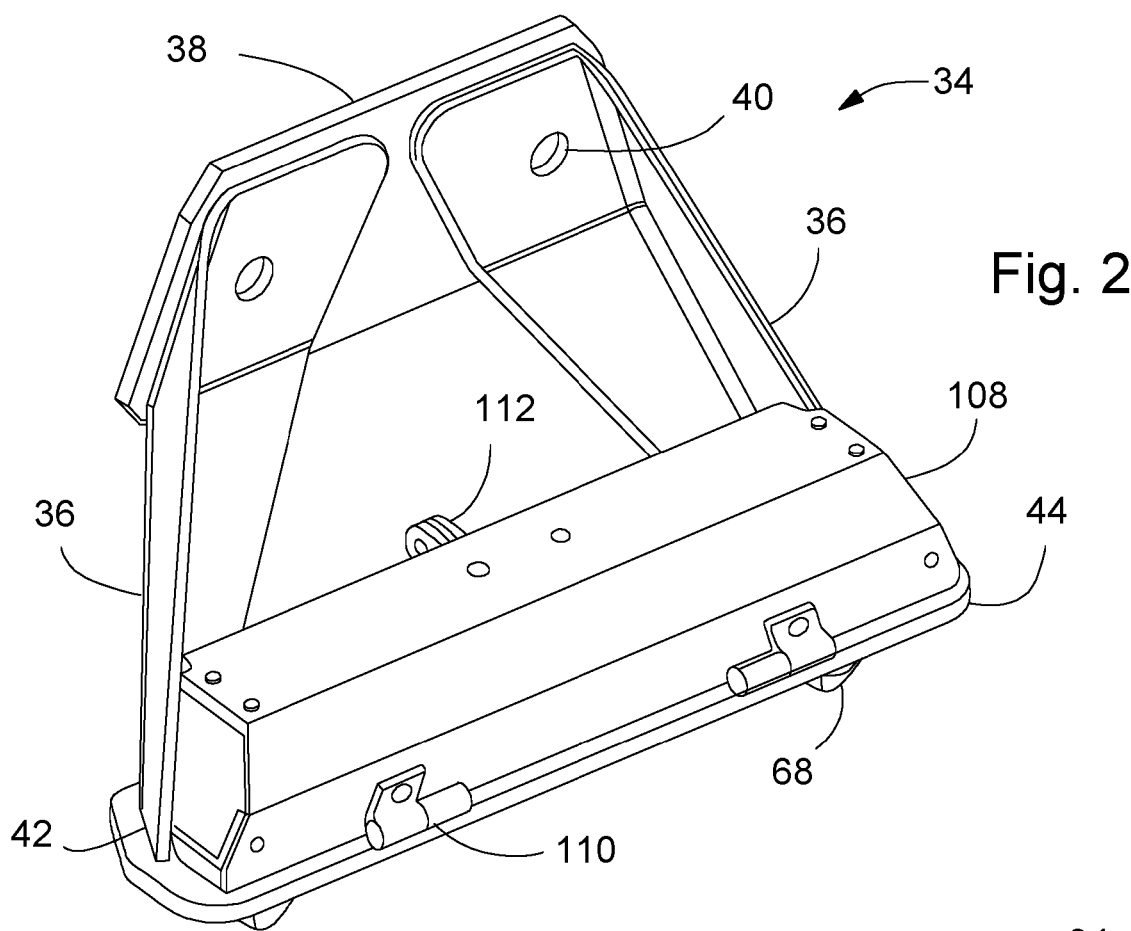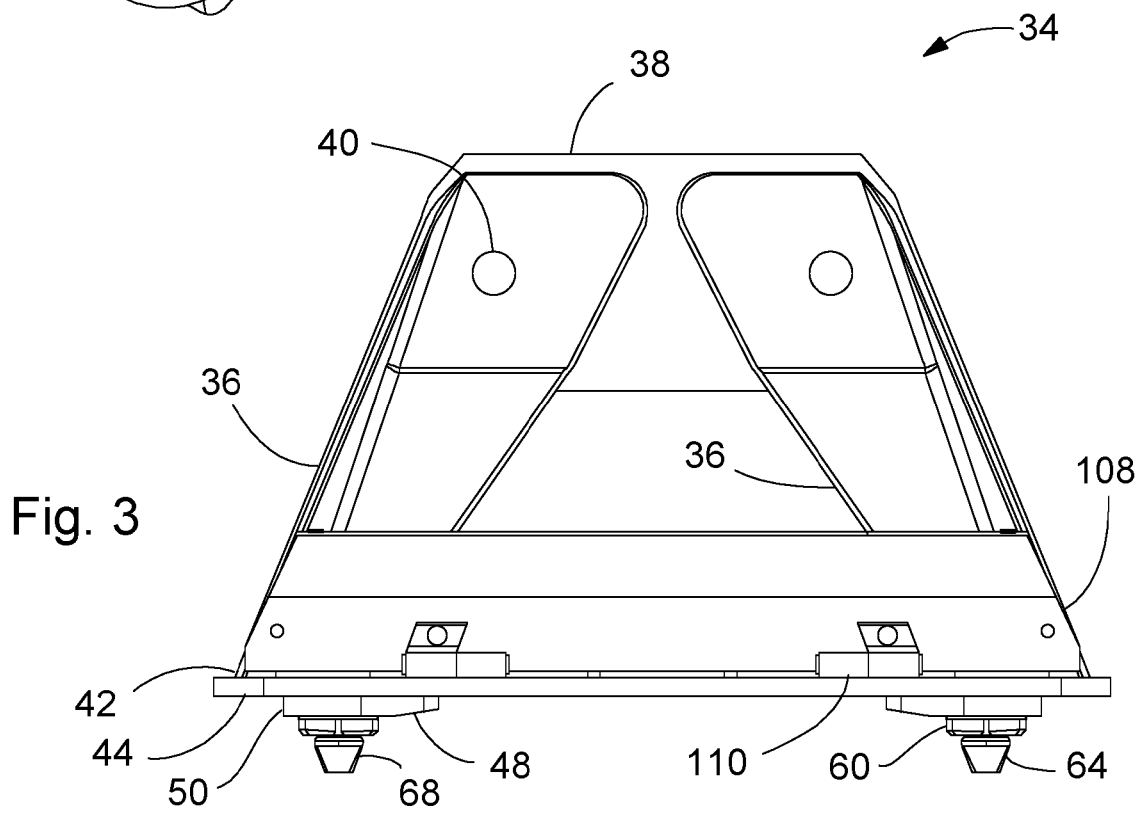

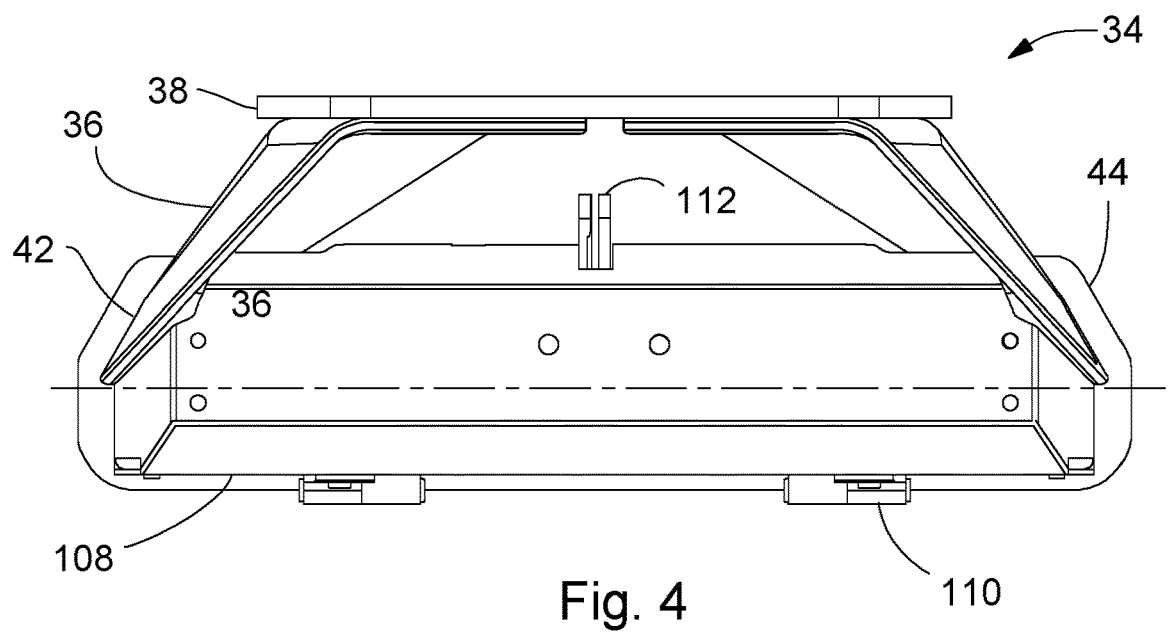
Fig. 4
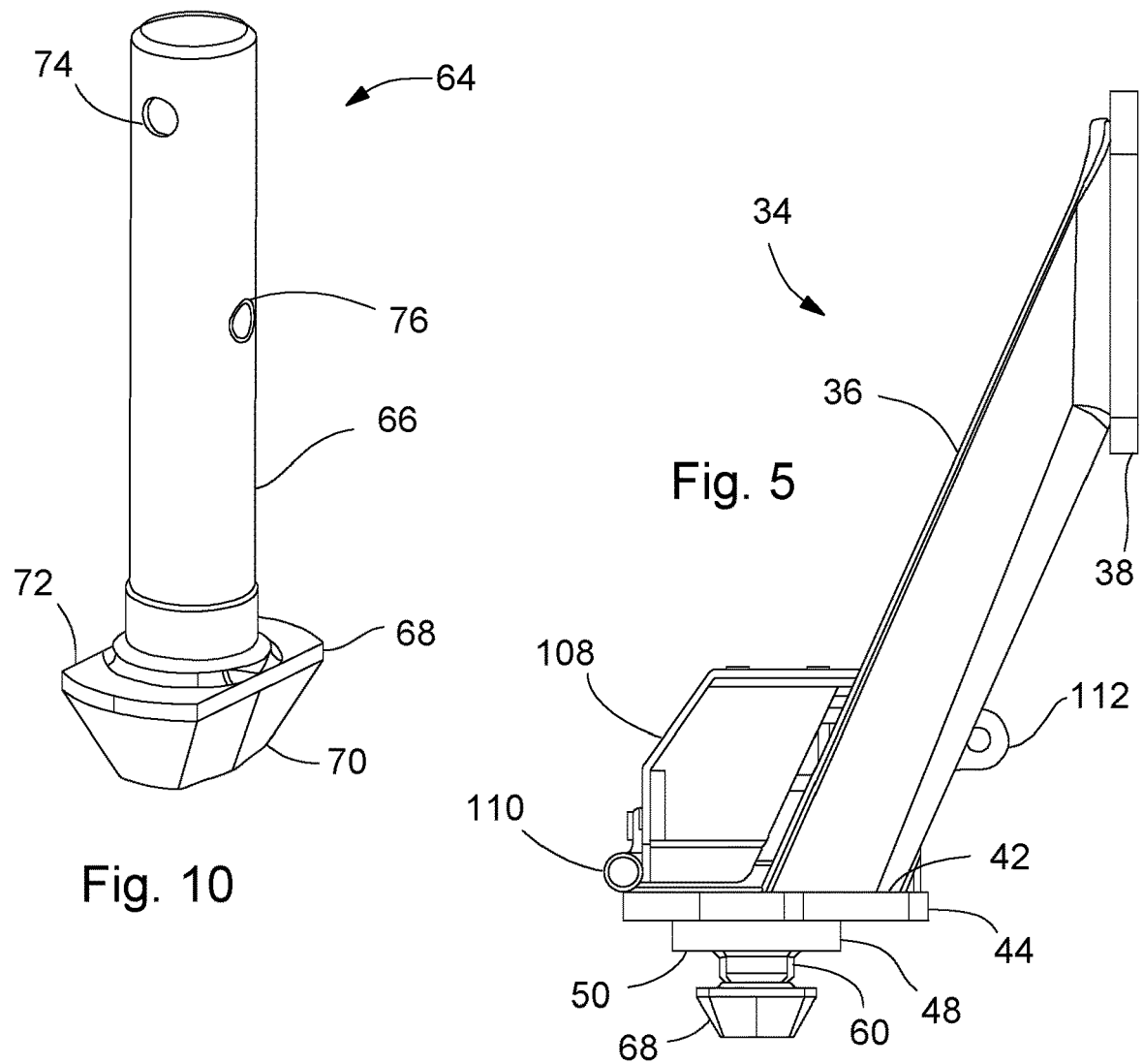
Fig. 10
Fig. 5

FIFTH-WHEEL ASSEMBLY

BACKGROUND OF THE INVENTION

The present invention relates generally to fifth-wheel assemblies that are mountable to the beds of trucks, such as pickup trucks.

Fifth-wheel assemblies are generally configured to mount to the beds of pickup trucks (or other types of trucks) in order to allow for the attachment of a trailer for towing by the truck. It is desirable for these assemblies to be easily and securely mounted while allowing for adjustments and tolerances for the alignment of the various components, holes, etc., and for the person installing the assembly to be assured that the installation is proper and secure. Moreover, it is desirable for the assembly, once mounted, to remain secured until such time as one wishes to remove the assembly from the truck.

SUMMARY OF THE INVENTION

An embodiment contemplates a fifth-wheel that may include a horizontal plate and a pair of legs extending upward therefrom; a pair of anchors, each having a bushing mounted under the plate, a cap, above the plate, secured to the respective bushing, a T-bolt extending vertically through the respective bushing and cap, and a handle secured to and extending radially outward from the respective T-bolt through a slot in the respective cap; and nuts securing each T-bolt to the respective anchor.

An embodiment contemplates a fifth-wheel that may include a plate and a pair of legs extending upward therefrom; a pair of anchors, each having a bushing mounted under the plate, a cap, above the plate, a T-bolt extending vertically through the respective bushing and cap, and a handle secured to and extending radially outward from the respective T-bolt through a slot in the respective cap; and a cover, pivotable to selectively provide and block access to the anchors.

An advantage of an embodiment is that the fifth-wheel can be easily and securely mounted on a bed of a truck, with allowances for adjustments to assure the proper alignment of the elements of the fifth-wheel to the truck. Another advantage is that the vertical position of the T-bolt can be adjusted easily to assure proper installation of the fifth-wheel to the truck. Another advantage is that, upon installation, a cover may be employed to assure that handles prevent the T-bolt from moving to an uninstalled position. Another advantage is conical washers employed with the T-bolts may help to dampen dynamic loads on the fifth-wheel.

BRIEF DESCRIPTION OF THE DRAWINGS

FIG. 2 is a perspective view of one leg of the fifth-wheel.

FIG. 3 is a side elevation view of one leg of the fifth-wheel.

FIG. 4 is a top plan view of one leg of the fifth-wheel.

FIG. 5 is fore-aft elevation view of one leg of the fifth-wheel.

FIG. 10 is a perspective view of a T-bolt of the one leg.

DETAILED DESCRIPTION

Figure 1:
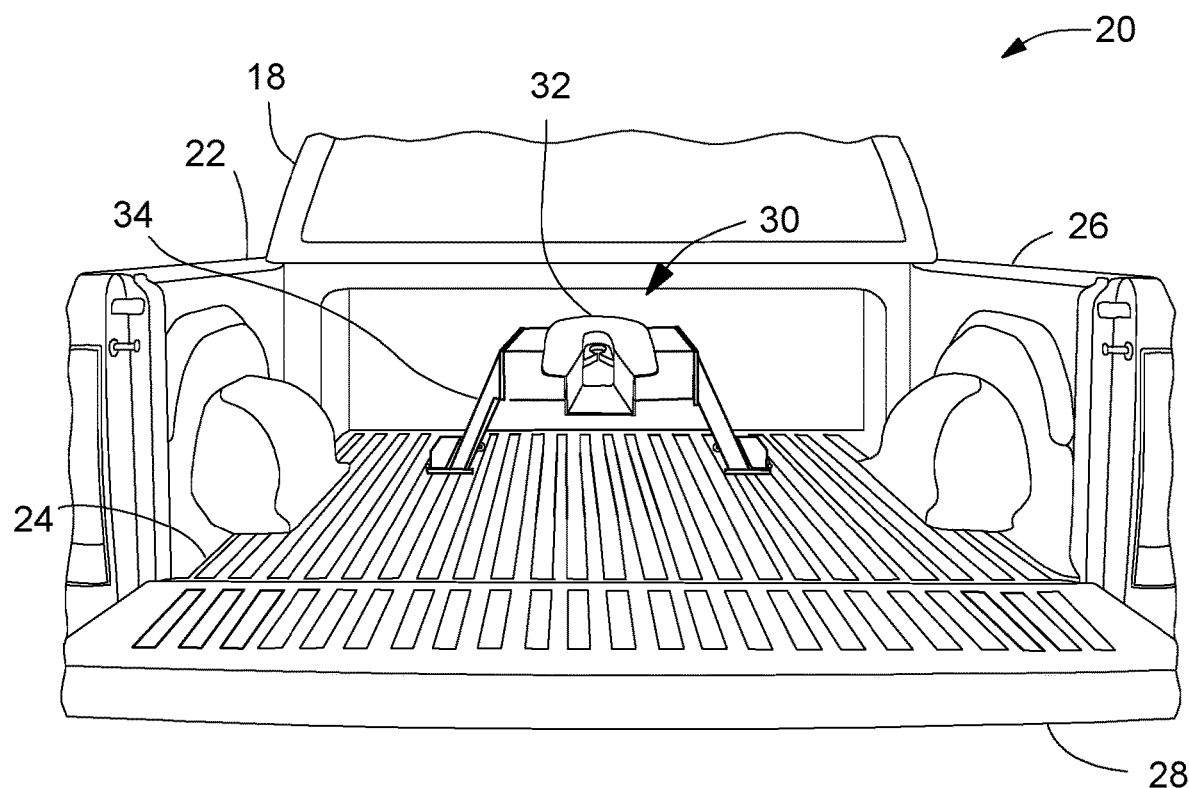
FIG. 1 is a schematic, perspective view of a rear portion of a pickup truck, with a fifth-wheel mounted therein.
Figure 9:
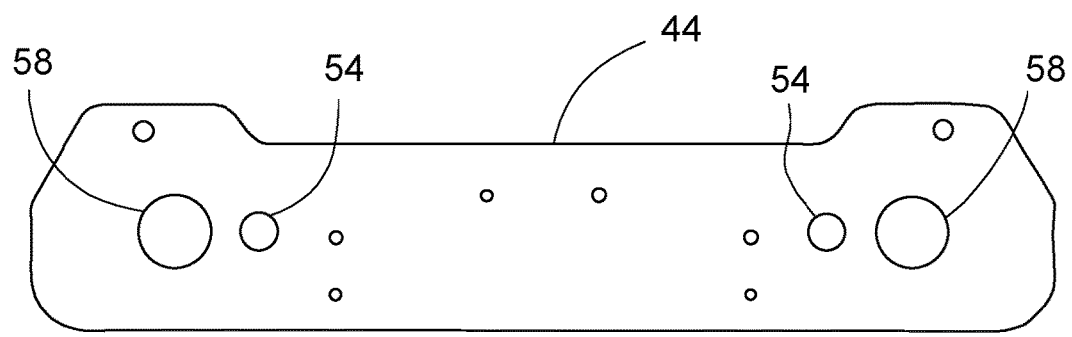
FIG. 9 is a plan view of a base plate of the one leg.
Figure 6:
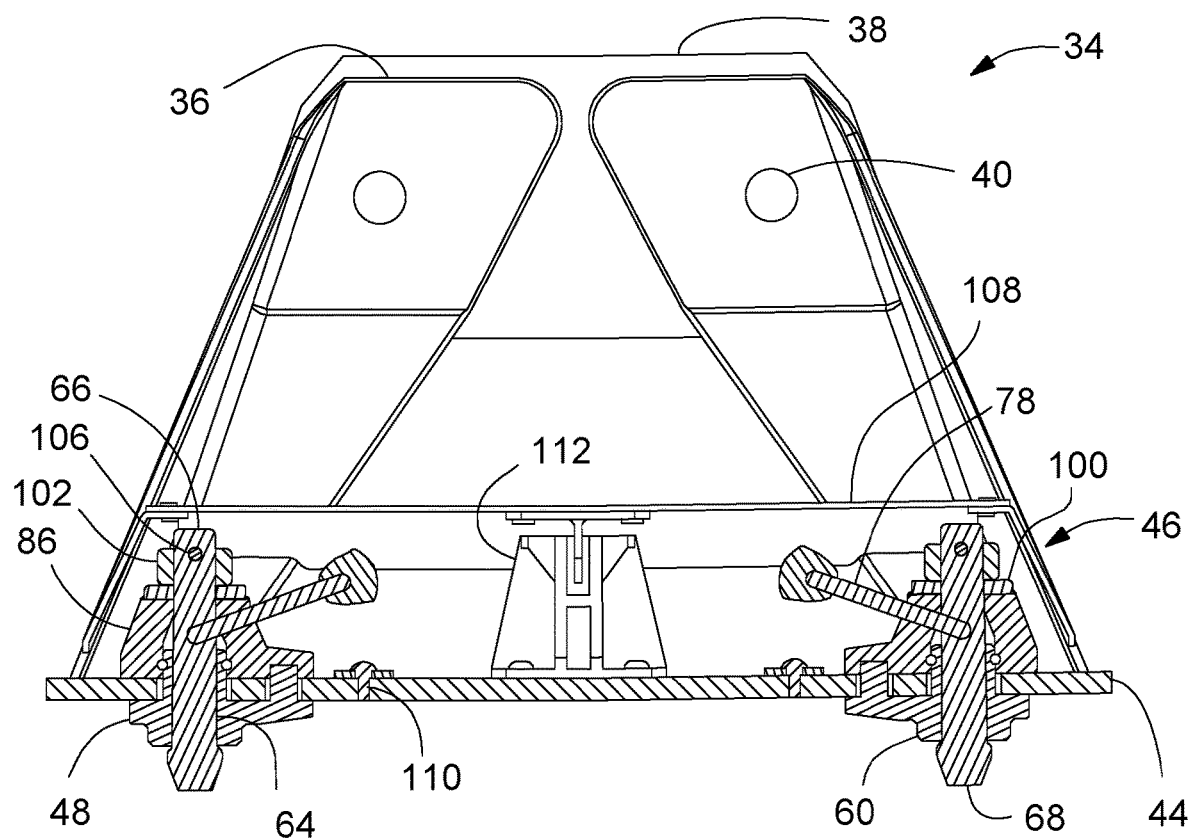
FIG. 6 is a side elevation view similar to FIG. 3, but with the lower portion in partial cross section.
Figure 11:
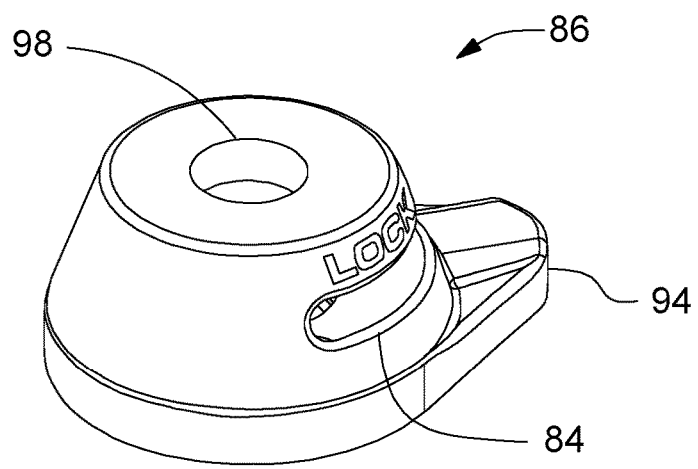
FIG. 11 is a perspective view of an anchor bushing cap of the one leg.
Figure 7:
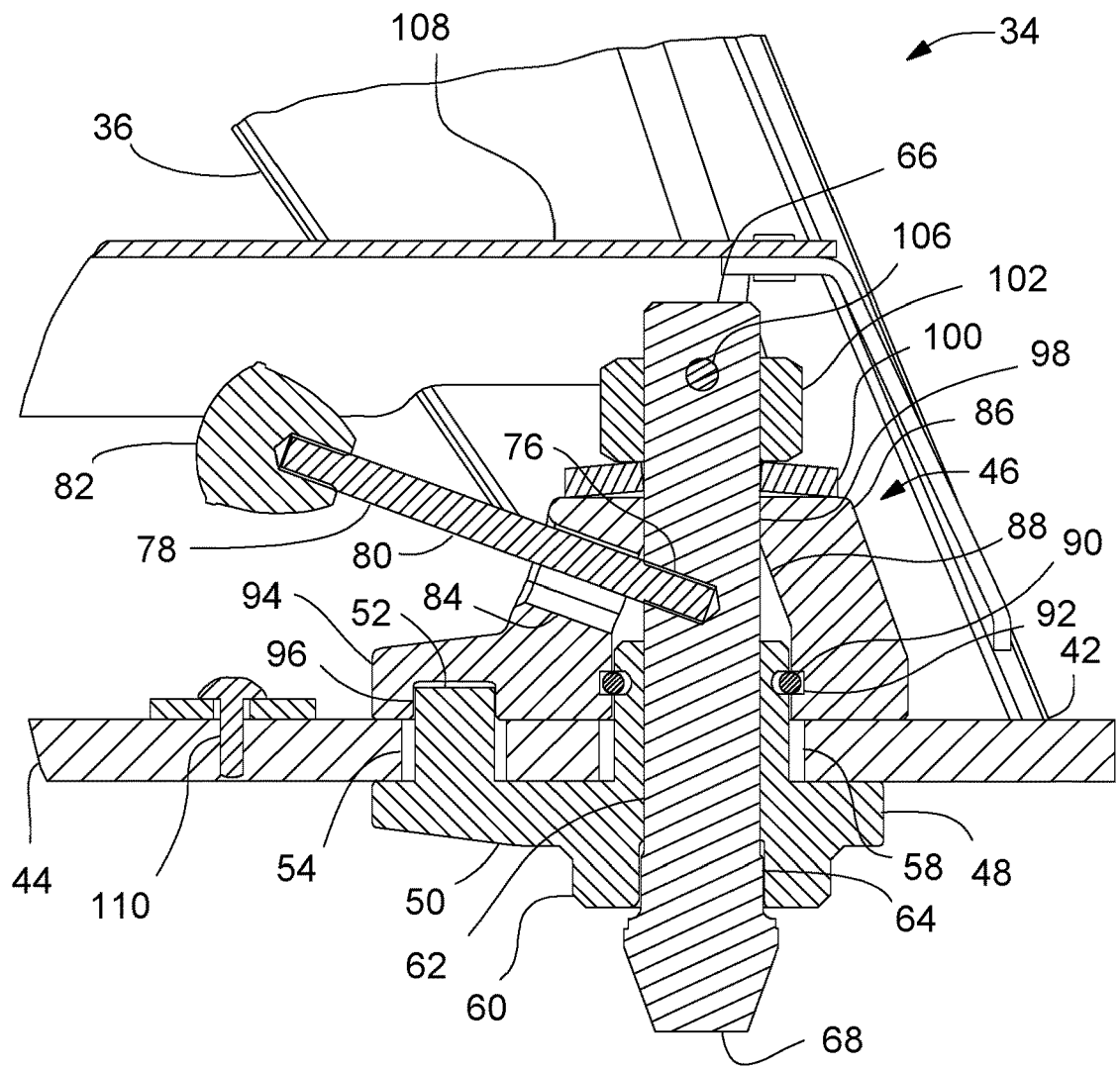
FIG. 7 is an enlarged view of a portion of one leg of the fifth-wheel in partial cross section.
Figure 12:
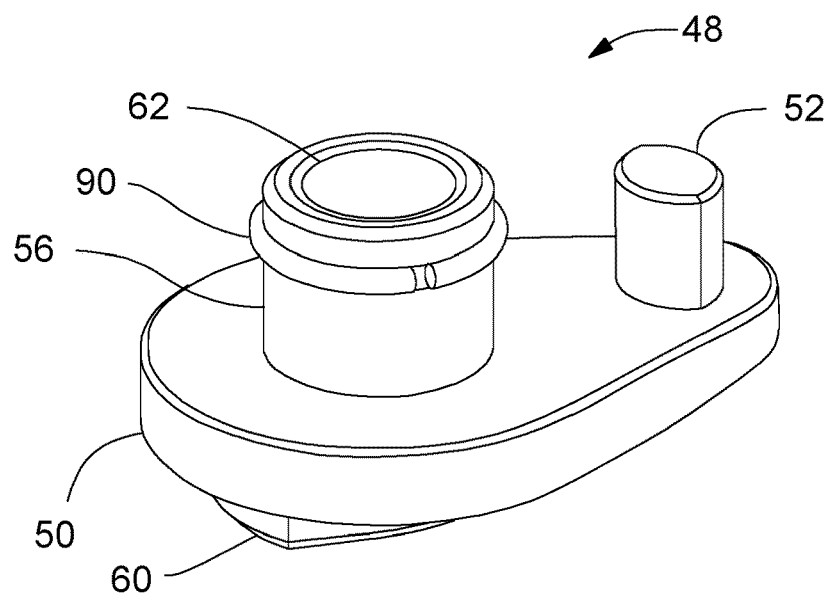
FIG. 12 is a perspective view of an anchor bushing of the one leg.
Figure 8:
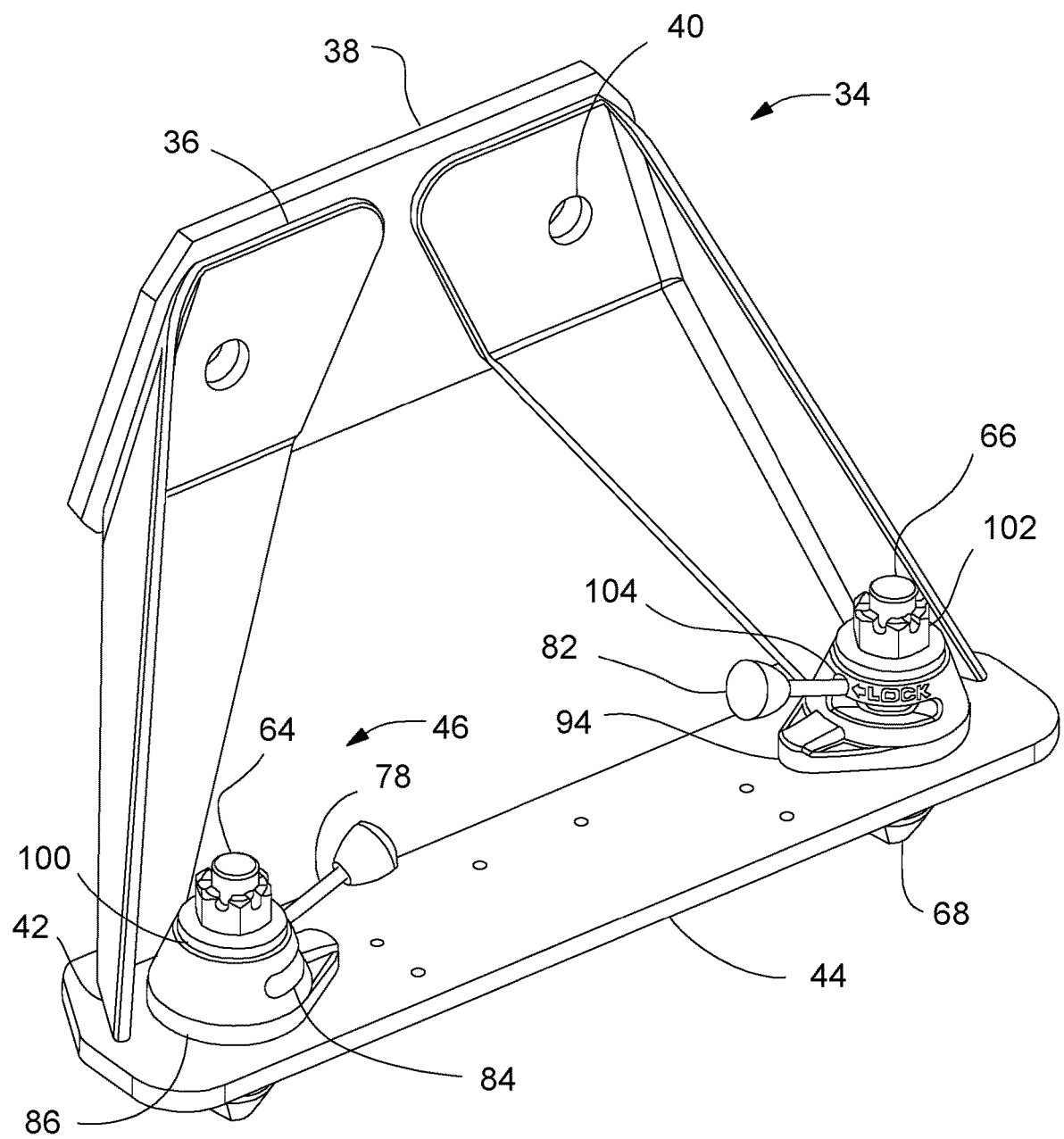
FIG. 8 is perspective view similar to FIG. 2, but showing only a portion of the leg.

FIG. 1 illustrates a vehicle 20, such as a truck, which may be a pickup truck (although the fifth-wheel described herein is applicable to other types of trucks and vehicles that employ fifth-wheels). The vehicle 20 may have a cab 18 in front of a bed 22, which may include a floor structure 24 and sidewalls 26, and may also include a tailgate 28. The floor structure 24 may include structure having mounting holes (not shown) for receiving and supporting a fifth-wheel 30—the structure may be, for example an H-frame (not shown) secured to and located above the plane of the main floor structure 24, with mounting holes (not shown) in the H-frame. The fifth-wheel 30 may include a center portion 32 for mounting a trailer hitch (not shown) of a trailer (not shown) to be towed by the vehicle 20. The center portion 32 may be generally conventional, if so desired. The fifth-wheel 30 may also include a pair of leg structures 34, one mounted on each side of the center portion 32, that support the center portion 32 and secure the fifth-wheel 30 to the floor structure 24 of the bed 22.

FIGS. 2-12 will now be discussed with reference to FIG. 1, with FIGS. 2-12 showing one leg structure 34, and various subassemblies thereof. Since the two leg assemblies 34 may be symmetrical with one another, the other leg assembly will not be shown in detail herein.

The leg structure 34 may include a pair of legs 36 and an upper plate 38 that may include fastener holes 40 (or other means of attachment) for securement to the center portion 32. The lower end 42 of each leg 36 is secured to a base plate 44, which may mount adjacent to the floor structure 24 of the bed 22. A pair of anchors 46 are mounted to the base plate 44.

Each anchor 46 may include an anchor bushing 48, which mounts on an underside of the base plate 44. Each anchor bushing 48 may include a body 50, which abuts the underside of the base plate 44; a cat-eye pin 52, which extends upward from the body 50 and aligns with and extends through an orientation hole 54 in the base plate 44; and a boss 56, which extends upward from the body 50, aligns with and extends through an anchor hole 58 in the base plate 44. The anchor hole 58 may have a larger diameter than the boss 56 and the orientation hole 54 may be larger than the cat-eye pin 52 in order to allow for adjustments (both fore-aft and laterally) that may be needed due to alignment or tolerance issues between the fifth-wheel 30 and the floor structure 24 of the vehicle 20. The cat-eye shape of the pin 52 may allow for limits on bushing rotation while allowing for movement of the pin 52 within the orientation hole 54 in the fore-aft direction.

The anchor hole 58 provides the access for deploying elements (discussed below) of the anchors 46 to engage with the floor structure 24, while the cat-eye pin 52 ensures that the anchor bushing 48 is at the proper orientation relative to the mating structure.

Each anchor bushing 48 may also include a disk 60, which extends downward from the body 50 and engages the floor structure 24. A bore 62 extends generally vertically through the disk 60, body 50 and boss 56.

A T-bolt 64 includes a shaft 66 that extends through the bore 62, and a head 68, which is on the lower end of the shaft 66, with the head 68 larger than the diameter of the shaft 66 and larger than the diameter of the bore 62. The diameter of the shaft 66 is similar in sized to the bore diameter in order to allow for rotation of the shaft 66 in the bore 62 while the bore 62 still supports the shaft 66. The head 68 includes a compound chamfer 70 on side surfaces, and an upper surface 72 for mating with the underside (not shown) of vehicle structure (floor structure). The compound chamfer 70 allows for easier insertion of the T-bolts 64 into the mating vehicle structure (by providing a self-alignment function). The head 68 is longer in a first direction, and shorter in a second direction that is ninety degrees from the first direction.

The shaft 66 includes a nut alignment hole 74 and a threaded handle hole 76.

A handle 78 has a threaded shaft 80, with one end that screws into the threaded handle hole 76, and another end to which a handle head 82 is secured. The handle extends from the T-bolt 64 through a slot 84 in an anchor bushing cap 86. The handle 78 extends generally radially outward from the shaft 66, although it may tilt slightly upward—the figures show a slightly upward tilt. The extending handle with the head 82 allow for an intuitive user interface when installing the fifth-wheel 30.

Each of the anchors 46 includes the anchor bushing cap 86, which includes a cavity 88 through which the T-bolt 64 extends and into which the boss 56 extends. A respective snap ring 90 extends around a circumference of each of the bosses 56 and extends radially into a corresponding notch 92 in the wall of the respective cavity 88, thus securing the corresponding anchor bushing 48 to its cap 86. Thus, the assembly of the anchor bushings 48 to the respective anchor bushing caps 86 can be easily achieved by inserting the bosses 56 into the cavities 88 until the snap rings 90 are received in the respective notches 92. While each anchor bushing 48 and corresponding anchor bushing cap 86 snap together, this does not cause a tight clamping to the base plate 44, which allows for tolerances between the T-bolts 64 and corresponding holes in the floor structure 24. Such a "float" of the T-bolts 64 due to the larger holes in the base plate 44, combined with the compound chamfers 70, provides, in effect, for some self-locating of the anchors 46 when mounting to the floor structure 24.

Each cap 86 also includes an arm 94 having a recess 96 positioned to receive the upper end of the cat-eye pin 52, thus assuring proper alignment between the bushing 48 and its respective cap 86.

The slot 84 in each of the caps 86 is shaped to allow its corresponding handle 78 to rotate approximately one-quarter turn (ninety degrees) about a generally vertical axis, which of course, then allows each of the T-bolts 64 to rotate by this same amount. This allows the T-bolt heads 68 to change orientation relative to holes in the floor structure 24 to selectively align either the long dimension of the head 68 or the short dimension of the head 68 relative to the particular location in the floor structure 24. Each of the slots 84 also includes a vertical portion 104 that the corresponding handle 78 can be slid into in order to hold the handle 78 in position relative to its respective cap 86.

The upper portion 98 of each of the cavities 88 is shaped to allow for rotation of the respective T-bolt shaft 66 while supporting the shaft 66, which extends through the corresponding upper portion 98 out of its cap 86.

A conical washer 100 is mounted on each of the shafts 66 above the respective cap 86. A castle-nut 102 threads onto each of the shafts 66 and at least partially compresses the respective conical washer 100, thus securing each T-bolt 64 to its corresponding anchor bushing 48 and cap 86. A pin 106 (such as a lynch or cotter pin) may be employed with each castle-nut 102 to ensure that it does not work its way loose on the corresponding shaft 66 by sliding the pin 106 through the corresponding nut alignment hole 74 and through slots in the respective castle-nut 102.

The castle-nuts 102 are easily accessed and rotatable to adjust the vertical positions of the T-bolts 64, which allows one to assure that the T-bolts 64 are snug to the mating truck structure (rather than too tight or too loose) when the fifth-wheel 30 is fully installed. The pin 106 utilized with the castle-nut 102 allows for fairly precise adjustment of the nuts 102 while allowing for locking the nuts 102 into position. The conical washers 100 under the castle-nuts 102 are partially compressed when the fifth-wheel 30 is fully installed, thus allowing for damping dynamic loads of the fifth-wheel 30.

Each leg structure 34 of the fifth-wheel 30 may also include a cover 108 that is pivotally mounted to the base plate 44, with hinge structure 110 on one side to allow for pivoting and a latch 112 on another side to selectively prevent the cover 108 from pivoting. Each cover 108 extends generally across the corresponding legs 36 and over the top of the corresponding anchors 46 to shield the anchors 46 when the cover 108 is in a closed position.

One will note that each cover 108 is also shaped and positioned so that, when the corresponding handles 78 are in the vertical portion 104 of the slots 84, the cover 108 can be pivoted to a closed position and the corresponding latch 112 secured to prevent the cover 108 from opening. This is the handle position where the fifth-wheel 30 is secured to the floor structure 24 of the vehicle 20. Accordingly, access to or movement of the handles (and hence anchors) is blocked, thus maintaining the anchors 46 secured to the vehicle 20.

On the other hand, when the handles 78 are at the opposed end of the slots 84 from the vertical portions 104, then the handles 78 extend outward (laterally) from the base plate 44, preventing the corresponding cover 108 from being pivoted to its closed position. This is the handle position where the fifth-wheel 30 is not secured to the floor structure 24 of the vehicle 20. Accordingly, one can visually observe that the installation of the fifth-wheel needs to be completed.

During installation, the fifth-wheel 30 may be positioned with the T-bolt heads 68 located above holes (not shown) in the corresponding floor structure 24 in the vehicle 20, and with the covers 108 open, allowing for the handles 78 to be oriented laterally (extending outward relative to the legs 36 and base plate 44). This position for the handles 78 orients the T-bolt heads 68 with the narrow direction oriented the same as the corresponding narrow direction of holes in the floor structure 24, thus allowing one to insert the T-bolt heads 68 into the holes. Each of the handles 78 are then rotated about ninety degrees in the anchor bushing cap slots 84, thus orienting the long dimensions of the T-bolt heads 68 with the narrow dimension of the corresponding holes in the floor structure 24. The castle-nuts 102 may then be tightened, pulling the upper surface 72 of the T-bolt head 68 securely against the floor structure 24 and also pulling the corresponding handle shafts 80 into the vertical portions 104 of the slots 84, thus preventing the handles 78 from rotating relative to the respective anchor bushing caps 86. Once the castle-nuts 102 are sufficiently tightened to secure the fifth-wheel 30 to the floor structure 24, then the pins 106 may be inserted through the nut alignment holes 74 to hold the nuts 102 in place. The covers 108 may then be closed and latched 112, maintaining the elements in their installed positions.

While certain embodiments of the present invention have been described in detail, those familiar with the art to which this invention relates will recognize various alternative designs and embodiments for practicing the invention as defined by the following claims.

The invention claimed is:

1. A fifth-wheel comprising:
   a horizontal plate and a pair of legs extending upward therefrom;
   a pair of anchors, each having a bushing mounted under the plate, a cap, above the plate, secured to the respective bushing, a T-bolt extending vertically through the respective bushing and cap, and a handle secured to and extending radially outward from the respective T-bolt through a slot in the respective cap, wherein the slot in each of the caps extends ninety degrees horizontally and includes a vertical portion at an end of the slot; and
   nuts securing each T-bolt to the respective anchor.

2. The fifth-wheel of claim 1 wherein each of the handles is configured to be pulled into the vertical portion when the respective nut is tightened on the respective T-bolt.

3. The fifth-wheel of claim 2 further including a pivotable cover that is configured to close when the handles are in a fifth-wheel installed position and configured to be prevented from closing when the handles are in a fifth-wheel uninstalled position.

4. The fifth-wheel of claim 1 further including a conical washer mounted between each nut and the corresponding cap.

5. The fifth-wheel of claim 1 wherein each of the bushings includes a boss that extends upward through the plate, around the respective T-bolt, and is secured within the respective cap with a snap ring.

6. The fifth-wheel of claim 5 wherein each of the bushings includes a cat-eye pin, spaced from the respective boss, extending upward through the plate into a recess in the respective cap, maintaining the orientation of the cap relative to the respective bushing.

7. The fifth-wheel of claim 1 further including a cover that is pivotable between an open position providing access to the anchors and a closed position blocking access to the anchors.

8. The fifth-wheel of claim 1 wherein the nuts are castle-nuts and each of the T-bolts includes a nut alignment hole configured to receive a respective pin for selectively preventing rotation of the castle-nut relative to the respective T-bolt.

9. A fifth-wheel comprising:
   a plate and a pair of legs extending upward therefrom;
   a pair of anchors, each having a bushing mounted under the plate, a cap, above the plate, a T-bolt extending vertically through the respective bushing and cap, and a handle secured to and extending radially outward from the respective T-bolt through a slot in the respective cap; and
   a cover, pivotable to selectively provide and block access to the anchors.

10. The fifth-wheel of claim 9 further including nuts securing each T-bolt to the respective anchor.

11. The fifth-wheel of claim 10 further including a conical washer mounted between each nut and the corresponding cap.

12. The fifth-wheel of claim 9 wherein the slot in each of the caps extends ninety degrees horizontally and includes a vertical portion at an end of the slot.

13. The fifth-wheel of claim 12 wherein each of the handles is configured to be pulled into the vertical portion when the respective nut is tightened on the respective T-bolt.

14. The fifth-wheel of claim 9 wherein the cover is configured to be closeable when the handles are in a fifth-wheel installed position and configured to be prevented from closing when the handles are in a fifth-wheel uninstalled position.

15. The fifth-wheel of claim 9 wherein each of the bushings includes a boss that extends upward through the plate, around the respective T-bolt, and is secured within the respective cap with a snap ring.

16. The fifth-wheel of claim 15 wherein each of the bushings includes a cat-eye pin, spaced from the respective boss, extending upward through the plate into a recess in the respective cap, maintaining the orientation of the cap relative to the respective bushing.

17. The fifth-wheel of claim 9 further including castle-nuts securing each T-bolt to the respective anchor, and each of the T-bolts includes a nut alignment hole configured to receive a respective pin for selectively preventing rotation of the castle-nut relative to the respective T-bolt.

18. The fifth-wheel of claim 9 wherein the slot in each of the caps extends ninety degrees horizontally and includes a vertical portion at an end of the slot, wherein each of the handles is configured to be pulled into the vertical portion when the respective T-bolt is in an installed position.

19. The fifth-wheel of claim 9 wherein each of the bushings includes a boss that extends upward through a respective hole in the plate, which hole has a larger diameter than the boss, each boss extending around the respective T-bolt and being secured within the respective cap with a snap ring, whereby each of the bushings may adjust in a horizontal plane relative to the respective plate.

20. A fifth-wheel comprising:
   a horizontal plate and a pair of legs extending upward therefrom;
   a pair of anchors, each having a bushing mounted under the plate, a cap, above the plate, secured to the respective bushing, a T-bolt extending vertically through the respective bushing and cap, and a handle secured to and extending radially outward from the respective T-bolt through a slot in the respective cap, wherein each of the bushings includes a boss that extends upward through the plate, around the respective T-bolt, and is secured within the respective cap with a snap ring; and
   nuts securing each T-bolt to the respective anchor.

* * * * *